United States Patent
Dymeck

[11] Patent Number: 5,868,411
[45] Date of Patent: Feb. 9, 1999

[54] BICYCLE MUDGUARD

[75] Inventor: Jeffrey Dymeck, Williamsport, Pa.

[73] Assignee: Jeffrey Eugene Dymeck, Williamsport, Pa.

[21] Appl. No.: 780,028

[22] Filed: Dec. 23, 1996

[51] Int. Cl.⁶ .................................................. B62D 25/16
[52] U.S. Cl. ................................... 280/152.1; 280/152.3; 280/852
[58] Field of Search .............................. 280/158.1, 152.1, 280/852, 152.3; 293/1

[56] References Cited

U.S. PATENT DOCUMENTS

| | | | |
|---|---|---|---|
| D. 298,820 | 12/1988 | Breen et al. | D12/186 |
| D. 316,995 | 5/1991 | Kowalski | D12/186 |
| D. 320,590 | 10/1991 | Dunn | D12/186 |
| D. 325,367 | 4/1992 | Cottel | D12/186 |
| D. 349,087 | 7/1994 | Rowley | D12/186 |
| 4,052,522 | 10/1977 | Narita | 428/31 |
| 4,234,241 | 11/1980 | Davis | 280/158.1 |
| 5,112,071 | 5/1992 | Jones | 280/152.3 |
| 5,120,073 | 6/1992 | Sealy, Jr. | 280/152.1 |
| 5,121,935 | 6/1992 | Mathieu et al. | 280/152.3 |
| 5,275,427 | 1/1994 | Gasser | 280/152.3 |
| 5,322,311 | 6/1994 | Dunn | 280/152.1 |
| 5,354,082 | 10/1994 | Tsai | 280/152.1 |
| 5,562,296 | 10/1996 | Hall et al. | 280/152.3 |

FOREIGN PATENT DOCUMENTS

| | | | |
|---|---|---|---|
| 2665416 A | 2/1992 | France | 280/152.1 |

*Primary Examiner*—Gary C. Hoge
*Assistant Examiner*—Jason Morrow

[57] ABSTRACT

A rear fender, or mudguard, is provided to defect tangential spray from the rear wheel of a bicycle. It emanates from the underside of the seat, being cantilevered over the rear wheel. The fender is attached by way of its design to the underside of the seat, being held in place by a forward tongue section and a middle section containing notches which attach to the metal seat rail supports. No metal fasteners are needed to attach and detach the fender. The fender is comprised of any available thermoplastic or thermosetting materials which can be formed, shaped, or fabricated by conventional means. These materials may contain additives such as colorants, reinforcing aides, stabilizers, and other compounding aides and fillers.

4 Claims, 1 Drawing Sheet

BICYCLE MUDGUARD

FIELD OF INVENTION

This invention relates to a fender, or mud guard, for bicycles in particular.

DESCRIPTION OF PRIOR ART

Modern cyclists who ride bicycles known as "mountain," "all-terrain," "dirt," and "street" bicycles are typically concerned with speed, and/or endurance, and, therefore seek after the lightest possible weight. Front and rear fenders typically add significant amounts of weight that cyclists find objectionable. Thus, cyclists will tend to remove metal fenders. Bicycle manufacturers today do not generally include fenders with a purchase. This presents no problem in dry riding conditions, both on the street or on mountain trails. However, in wet conditions especially after a rainstorm when the ground is still wet, lack of fenders, especially a rear fender, will result in an uncomfortable situation for the cyclist. Water and mud will be picked up by the tires and thrown on the cyclist, especially on his/her backside. Raincoats are not always available or comfortable. This leads to a cyclist sacrificing comfort for speed.

A conventional fender for a bicycle is fixed by the seat post or the frame of the bicycle and requires a fixing means to support the rear end of the fender so that it is not easy to assemble or dismantle.

The present invention has arisen to overcome the problems associated with fender weight and the ease of attachment an detachment of a rear mud guard on bicycles.

SUMMARY OF THE INVENTION

The primary objective of the present invention is to provide a fender, or mudguard, for a bicycle. Two major advantages of this present invention will become obvious from further reading. The first is the lightweight nature of the fender due to its design and material of construction. The second is the placement of the fender under the seat of the rider with its concurrent ease of attachment and detachment. The fender uses no additional hardware to keep it attached even under the most severe riding conditions.

In accordance with one aspect of the present invention, there is provided a mudguard for a bicycle comprised of a lightweight, durable, ridged, or semi-ridged plastic element positioned to deflect tangential spray from the rear wheel that would strike the backside of the cyclist. The fender is designed in such a manner that it can be attached or detached without the use of hand, or power tools; hence it is portable. No metal fasteners are used which can add weight to the bicycle and complexity to the installation.

The one piece fender, or mudguard, is comprised of a forward tongue portion which fits precisely through the metal rail supports under the seat and wedges itself underneath the forward portion of the seat between the converging metal rails and the underside of the seat. The middle portion has notches that attach precisely between the substantially vertical metal seat rail supports on the underside of the seat. Placement of notches varies in accordance with the specifications of various seat manufacturers. The notches may, or may not use rubber grommets as additional fastening support. The middle section may also consist of a bend to give the proper angle for the rear portion of the fender to cantilever out over the rear wheel. The rear portion of the ridged, or semi-ridged fender is a saddle-like shape and is cantilevered over the rear wheel, being held firmly in place by the tongue and middle portion at the notches.

Further objectives and advantages of the present invention will become apparent from a careful reading of the detailed description provided below, with appropriate reference to the accompanying drawings.

DETAILED DESCRIPTION OF PREFERRED EMBODIMENTS

Figure 1:
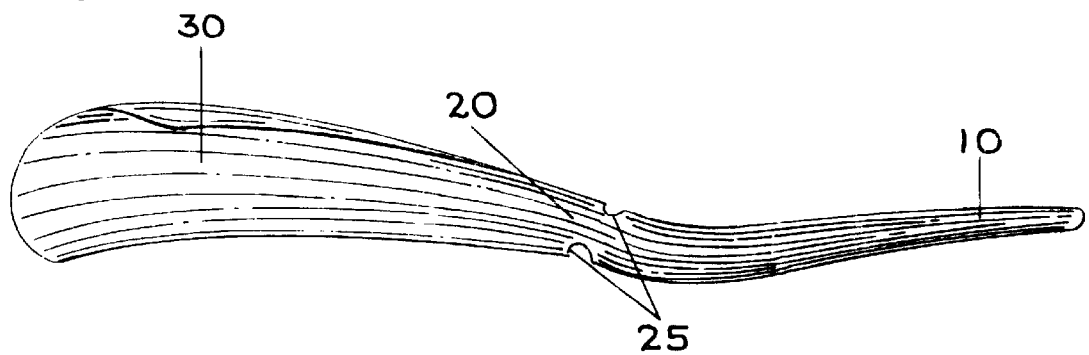
FIG. 1 is a perspective view of the present invention detached from the bicycle seat.
Figure 2:
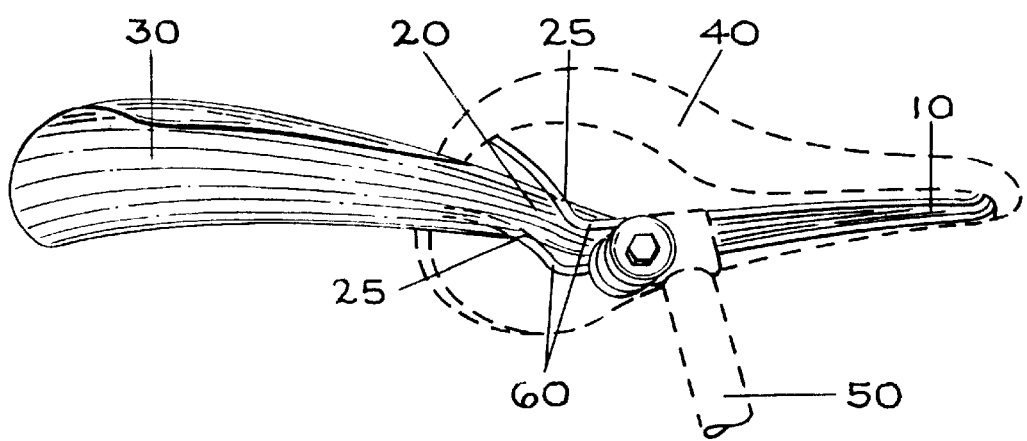
FIG. 2 is a perspective view from underneath the seat illustrating the position of the tongue portion, the middle portion attached at the notches to the seat rails, and the rear portion of the fender.

For a better understanding of the present invention, reference is made to FIGS. 1 and 2. The bicycle fender is a single piece construction and is composed of the front, or the tongue portion 10, the middle portion 20, and the rear, saddle-like shaped portion 30. In addition, the means of fixing, namely two opposing notches on either side of the middle portion are shown 25. Typical dimensions are 25 to 50 cm long from the tongue 10 to the rear 30, and 5 to 20 cm wide at the widest portion of the rear 30. The saddle shape can range from a planar, flat shape or infinite radius, to a radius of 5 cm for the narrowest fender. The length of the rear portion 30 which is cantilevered out over the rear wheel was determined by drawing a line parallel to the ground from the bottom of the seat 40 rearward. This line intersected a line connecting the tangent of the rear-most portion of the rear tire to the back of the head of a cyclist while standing on the pedals. The distance from the rear of the seat to the intersection is typically between 10 and 25 cm, and depends on the size of the cyclist, seat size and the bicycle frame and wheels. Adding the range of length of the tongue 10 and middle portion 20, between 10 and 20 cm, results in an overall length of the fender, FIG. 1, between 20 and 45 cm. Adding at least 5 cm beyond the point of intersection for a margin of splash safety results in an overall length between 25 and 50 cm. Overall width at the widest portion of the saddle 30 is between 5 and 20 cm. The middle portion 20 may consist of a straight shape, a step shape, of an angled shape to give the desired appearance and splash protection. This will depend upon the seat construction and cyclist preference.

FIG. 2 also shows the perspective view from underneath the seat. The two notches 25 in the middle portion 20 are clearly shown secured to the seat rails 60, being used as a means of fixing the mudguard to the underside of the seat. The forward tongue portion 10 is also an integral part of the fixing means in order to give a point of attachment of the cantilevered rear portion 30.

An object of the present invention is the ease of attaching and detaching the mudguard. All other inventions discovered rely on metal fasteners such as screws, bolts, nuts and washers as a means of securing the mudguard. The geometry, as clearly discussed above, and materials of construction which shall be discussed below, clearly eliminate the need for such labor intensive fastening means. This mudguard is simply attached by sliding the tongue portion 10 through the metal seat rails 60 then twisting the notches 25 of middle portion 20 around the seat rails 60. No other work is needed. Removal is just as easy. The process is simply reversed.

The mudguard of the present invention can be made from any commercially available thermoplastic, or thermosetting plastics, as well as thermoplastic elastomers, or vulcanized rubber. Thermoplastic materials are a preferred embodiment due to ease of processing and cost. They may consist of any of the class of polyolefins, including polyethylene in all its commercial forms, polypropylene in all its commercial forms and combinations of the two in all proportions. Other thermoplastics may include polyamides, polyesters, polycarbonates, acetals, cellulose esters, impact modified polystyrenes, acrylonitrile butadiene styrene (ABS) thermoplastic, poly(vinylchloride) and other thermoplastic known as engineering thermoplastics. Different materials may be needed for different road and trail conditions. In all cases, the thermoplastics materials may be filled, or unfilled, colored for decorative, or safety purposes, or made from plastic in its natural form as supplied by the producer or distributor. Colorants may be organic, or inorganic in nature, extenders may consist of carbon black, graphite, calcium carbonate, and various inorganic oxides such as silicon dioxide. Reinforcing aides may be chosen from the class of organic and inorganic glasses and may or may not contain coupling agents such as silane. In some cases, some or all the of plastic may be post-consumer recycled plastic obtained from appropriate sources such as landfill operators and recycling centers. Appropriate chemical additives to prevent oxidation, ultraviolet light stabilization and other aging processes may be introduced into the compounded material. Foaming agents may be introduced to further reduce weight without sacrificing performance.

Thermosetting polymers may also be used. These may include polyester "fiberglass" types, epoxy resins, or polyurethanes. Any of these materials may be filled, or unfilled, pigmented for decorative, or safety purposes, or in the natural state. Thermosets may result in a "ridged" mudguard.

Vulcanized rubber mudguards may be made from any of the common elastomeric materials. These include vulcanized polybutadiene, polyisoprene, poly(butadiene/styrene) rubber, nitrile, butyl, natural rubber, and solid urethane elastomer. Thermoplastic elastomer mudguards may be made from poly(styrene/isoprene) elastomer, poly(ethylene/propylene) elastomer, or poly(styrene/butadiene) elastomer.

The fender my be manufactured by any of the common plastics fabricating methods. Fenders made of thermoplastic materials may be processed by injection molding, vacuum/thermoforming, rotational molding, or profile extrusion with subsequent mechanical trimming. Injection molding or vacuum forming are the preferred methods for large scale manufacturing. For fenders made of thermosetting plastics, processing methods such as compression and transfer molding, laminating, roll forming and casting may be invoked. Compression and transfer molding may be used to manufacture mudguards made of thermoplastic elastomers and vulcanized rubber.

EXAMPLES OF PROTOTYPES

Example 1

The first prototypes was hand fashioned. A black, five gallon plastic (polypropylene) bucket was cut into the rough shape of FIG. 1. It was then made smooth with a small saw, file and sanded to shape. The bend was made by gently heating over a stove until the plastic was ductile. The mudguard was held until the plastic cooled enough to hold its shape. Finally, the notches were shaped with a knife.

The mudguard was placed in service on the inventor's personal mountain bike onto the rails of an Avocet™ seat. It has been in service for over one year. While some signs of wear are apparent and the mudguard has been installed and removed on numerous occasions it is still functioning as intended. The cantilever action has held even with large amounts of mud and debris that have accumulated during severe weather conditions. The mudguard has been simply removed for washing and reinstalled.

Example 2

The next, similar mudguard was made by first making a metal die of similar shape, then a plaster mold on which the metal die rested, then vacuum forming a sheet of 3/16" thick vacuum forming grade natural polypropylene sheet. Flash was removed using a jig saw, then lightly sanding the edges. Notches were cut to fit onto the rails on each side of an Avocet™ seat using a specially made punch.

Example 3

The next, similar mudguard was made by using the metal die of Example 2, and the plaster mold of Example 2, then vacuum forming a sheet of 3/16" thick vacuum forming grade natural polyethylene sheet. Flash was removed using a jig saw, then lightly sanding the edges. Notches were cut to fit onto the rails on each side of an Avocet™ seat using a specially made punch.

Example 4

The next, similar mudguard was made by using the metal die of Example 2, and the plaster mold of Example 2, then vacuum forming a sheet of 3/16" thick vacuum forming grade black ABS sheet. Flash was removed using a jig saw, then lightly sanding the edges. Notches were cut to fit onto the rails on each side of an Avocet™ seat using a specially made punch.

Example 5

The next, similar mudguard was made by using the metal die of Example 1, and the plaster mold of Example 1, then vacuum forming a sheet of 3/16" thick vacuum forming grade gray poly(vinylchloride) sheet. Flash was removed using a jig saw, then lightly sanding the edges. Notches were cut to fit onto the rails on each side of an Avocet™ seat using a specially made punch.

What I claim is:

1. A single piece rear fender for bicycles having front and rear mounted tires, wheels, axles, a framework and at least one seat with converging metal support rails which meet underneath at the front of the seat, said rear fender comprised of a rigid, or semi-ridged plastic element positioned as a means to deflect tangential spray from the rear wheel and emanating from the underside of the seat being supported by means of a forward tongue portion and a middle portion contoured and containing side notches in such a manner as to wedge the forward tongue between the converging support rails and the forward underside of the seat, and to securely fit the middle portion between the metal seat rail supports of said seat, by use of said notches, the rear portion being cantilevered out over the rear wheel.

2. The bicycle fender of claim 1 which is between 25 and 50 cm in length and between 5 and 25 cm wide at the widest portion.

3. The bicycle fender of claim 1 being comprised of thermoplastic material.

4. The bicycle fender of claim 1 being comprised of thermosetting plastic.

* * * * *